Sept. 7, 1965 G. A. ARMSTRONG 3,204,426
ADJUSTABLE FINGER RING
Filed Aug. 23, 1963

INVENTOR
GEORGE A. ARMSTRONG
BY
*Barlow & Barlow*
ATTORNEYS

Sept. 7, 1965  G. A. ARMSTRONG  3,204,426
ADJUSTABLE FINGER RING
Filed Aug. 23, 1963

INVENTOR
GEORGE A. ARMSTRONG
BY
*Barlow & Barlow*
ATTORNEYS

Sept. 7, 1965  G. A. ARMSTRONG  3,204,426
ADJUSTABLE FINGER RING
Filed Aug. 23, 1963
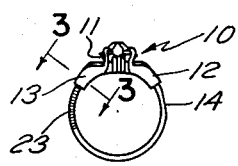
FIG. 1
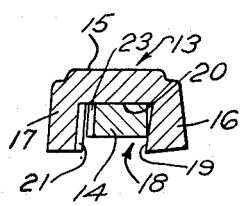    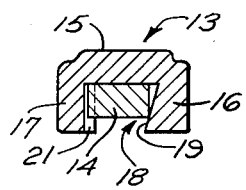
FIG. 2   FIG. 3
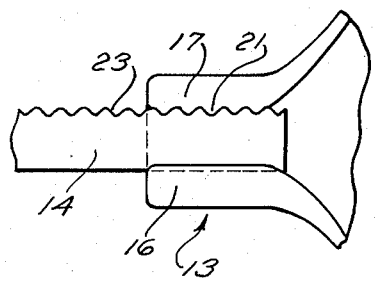
FIG. 4
INVENTOR
GEORGE A. ARMSTRONG
BY
*Barlow & Barlow*
ATTORNEYS

United States Patent Office 3,204,426
Patented Sept. 7, 1965

3,204,426
ADJUSTABLE FINGER RING
George A. Armstrong, Cranston, R.I., assignor to Budlong, Docherty & Armstrong, Incorporated, a corporation of Rhode Island
Filed Aug. 23, 1963, Ser. No. 304,018
1 Claim. (Cl. 63—15.5)

This invention relates to an adjustable finger ring of a character to permit a single shank to be produced for a range of finger ring sizes.

In the construction of the usual rigid form of finger rings, the manufacturer is obliged to make a range of sizes of ring shanks and the selling jeweler usually has to cut the shank and solder it back together again in order to fit the finger of the purchaser. This is objectionable on the retail level since a charge is made by the jeweler for performing this service and it is, accordingly, an object of the present invention to provide a ring of a character wherein the shank portion thereof is made adjustable but which may become fixed by a simple operation of the jeweler at the point of sale.

A further object of the invention is to construct essentially a one-piece solderless adjusting finger ring at minimum cost.

A more specific object of the invention is the provision of a finger ring construction comprising a setting means with end portions, one end portion having a shank integral therewith and continuing around in arcuate section to telescope with the other end of the setting means and being provided in the telescoping section to hold the shank portions of the setting means together.

With these and other objects in view, the invention consists of certain novel features of construction as will be more fully described and particularly pointed out in the appended claim.

Referring to the drawings.

Figure 3:
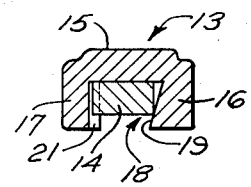
FIG. 3 is a view taken in the same position as FIG. 2 but with the parts in embracing relationship one with the other.
Figure 4:
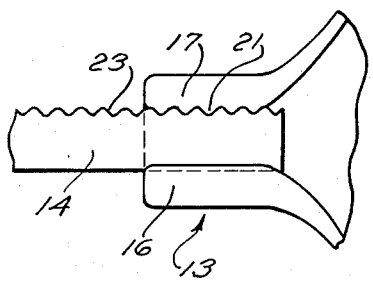
FIG. 4 is an enlarged bottom view of FIG. 3 showing the interconnection between the setting and the shank.
Figure 1:
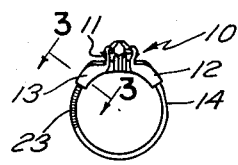
Figure 2:
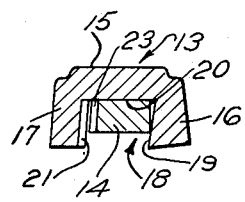
Figure 3:
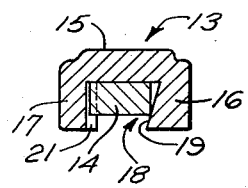
Figure 4:
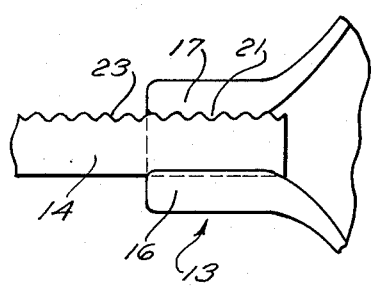

In the drawings, 10 generally designates the ornament carrying portion of a ring which is generally made up of a setting 11 and two arms 12 and 13 that extend arcuately from the setting 11. In the present instance the section 12 merges into a band 14 which band is in arcuate form and extends in a circle over to the arm 13. The construction of the arm 13 is shown more particularly in FIGS. 2, 3 and 4 and here it will be seen that this arm is constructed with a top section 15 and two legs 16 and 17 which form in the underside of the arm 13 a recess 18. The recess 18 is defined by three walls, the inner side of leg 16 being a wall 19 and upper wall 20 and a wall 21 on the inner side of the leg 17 which presents a serrated face 21.

Figure 1:
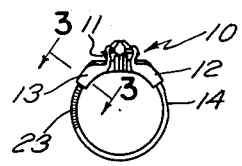
FIG. 1 is an elevational view of a ring structure constructed in accordance with the invention.
Figure 2:
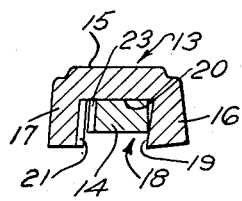
FIG. 2 is an enlarged sectional view taken substantially on lines 3—3 of FIG. 1 before movement into finished position.

The free end of the band 14 has one portion thereof with a plurality of serrations as at 23. While, of course, the band 14 is illustrated in the drawings as being of rectangular sections, it should be understood that other cross-sectional shapes usual to the ring art such as oval may be utilized, in which case the serrations 23 might not be specifically located on a face of the band but at least on one sector thereof. The end of the band 14 having the serrations 23 is then inserted into the recess 18 and in normal arrangement the size of the recess 18 is such as to freely accept the band for sliding movement therein such as shown in FIG. 2. Also, it will be noticed that the recess 18 is formed in a fashion whereby the band 14 is prevented from dropping out of the downwardly opening recess. To this end, the wall 19 is inclined inwardly such that the entire leg 16 may be said to be wedge shaped in cross section. Other arrangements, of course, can be utilized to assist in retaining the band 14 in the recess.

With the parts assembled as shown in the drawings and the serrated portion 23 of the band 14 within the recess 18, the ring is in condition to be sized. To accomplish this, the ring is placed on the usual sizing arbor used in the finger ring trade until it rests at the location on the arbor which represents the size of the intended wearer. At this point, the band 14 and particularly the serrated end is pressed into the recess 18 until a tight fit is made around the sizing arbor. Since the band 14 is made from a deformable type of material which exhibits a certain amount of rigidity, once deformed into a particular shape, or arcuate section, it will remain in that position. Accordingly, a pair of jeweler's pliers may be placed across the legs 16 and 17 of part 13 and pressure applied so as to squeeze the legs 16 and 17 toward each other while the ring is on the arbor. When this is done, one of the legs will bend inwardly toward the other and in the illustrated form it is shown that the leg 16 has been so bent inwardly pressing the serrated face 23 of the band 14 into engagement with the serrated wall 21 of the leg 17. The ring has now been completely sized, the band 14 being held in adjusted position. By virtue of the fact that the serrations 23 on the band 14, mate with the face 21 as shown more particularly in FIG. 4, it will also be apparent that should at a later date a resizing be necessary, the legs 16 and 17 may be forced apart and the operation completed again.

It will accordingly be appreciated that there is provided herein an adjustable finger ring construction which is relatively simple to manufacture and to use but when in use provides a finger ring which is not discernable from the solid type of finger band constructions.

I claim:

An adjustable finger ring comprising an ornamental portion, an arm extending from said portion, an arcuate band secured to said portion and extending from said portion in the opposite direction to said arm, said arm being of ductile bendable material and having a recess means defined by a bottom wall, two legs and an open side, one of said legs having a serrated face in said recess means, said band being received in said recess means and having a serrated end means, said serrated end means being adapted to lie opposite said serrated face for interfitting engagement one with the other in one of a plurality of selected positions for sizing, the other leg of said recess means being bendable to incline the same inwardly to restrict the open side of the recess means for holding said serrated portions in said interfitting engagement.

References Cited by the Examiner

UNITED STATES PATENTS

| 253,069 | 1/82 | La Grange | 63—15.65 |
|---|---|---|---|
| 293,044 | 2/84 | Lewkowitz | 63—15.65 |
| 712,765 | 11/02 | Cole | 24—20 |
| 1,409,138 | 3/22 | Fontana | 63—15.5 |
| 1,587,809 | 6/26 | Walker. | |

FOREIGN PATENTS 51,872   5/89   Germany.

RICHARD C. PINKHAM, *Primary Examiner.*